(12) United States Patent
Ito (10) Patent No.: US 9,992,377 B2
(45) Date of Patent: Jun. 5, 2018

(54) INFORMATION PROCESSING APPARATUS FOR AUTHENTICATING USER, INFORMATION PROCESSING METHOD

(71) Applicant: KYOCERA Document Solutions Inc., Osaka-shi, Osaka (JP)

(72) Inventor: Satoshi Ito, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days. days.

(21) Appl. No.: 15/360,290

(22) Filed: Nov. 23, 2016

(65) Prior Publication Data

US 2017/0155801 A1 Jun. 1, 2017

(30) Foreign Application Priority Data

Nov. 27, 2015 (JP) ................................. 2015-232437

(51) Int. Cl.
*H04N 1/44* (2006.01)
*G06F 21/31* (2013.01)
*G06F 21/60* (2013.01)

(52) U.S. Cl.
CPC ........... *H04N 1/4413* (2013.01); *G06F 21/31* (2013.01); *G06F 21/608* (2013.01); *H04N 1/4433* (2013.01); *H04N 2201/0094* (2013.01)

(58) Field of Classification Search
CPC .................................................. H04N 1/4413
USPC ....................................................... 358/1.14
See application file for complete search history.

(56) References Cited

U.S. PATENT DOCUMENTS

| | | | | |
|---|---|---|---|---|
| 8,422,048 B2* | 4/2013 | Yasuhara | .............. | G06F 21/608 358/1.14 |
| 2014/0333960 A1* | 11/2014 | Fukasawa | .......... | G06K 15/1817 358/1.15 |
| 2017/0070646 A1* | 3/2017 | Kobayashi | ......... | H04N 1/00854 |

FOREIGN PATENT DOCUMENTS

JP 2012008734 A 1/2012

* cited by examiner

*Primary Examiner* — Jacky X Zheng
(74) *Attorney, Agent, or Firm* — Alleman Hall Creasman & Tuttle LLP (57) ABSTRACT

An information processing apparatus includes a reception processing portion, an authentication determining portion, a presence/absence determining portion, a storage processing portion, and a process executing portion. The reception processing portion receives an authentication code input via an operation portion. The authentication determining portion determines whether an authentication is successful or unsuccessful based on the authentication code. The presence/absence determining portion determines whether the authentication code by which the authentication was determined to be unsuccessful is present or absent in a first storage portion. The storage processing portion stores the unsuccessful authentication code in the first storage portion after a determination of the presence/absence determining portion. The process executing portion executes a predetermined process when a number of times that the presence/absence determining portion determined that the authentication code was absent has exceeded a predetermined upper limit number of times.

5 Claims, 6 Drawing Sheets

INFORMATION PROCESSING APPARATUS FOR AUTHENTICATING USER, INFORMATION PROCESSING METHOD

INCORPORATION BY REFERENCE

This application is based upon and claims the benefit of priority from the corresponding Japanese Patent Application No. 2015-232437 filed on Nov. 27, 2015, the entire contents of which are incorporated herein by reference.

BACKGROUND

The present disclosure relates to an information processing apparatus for authenticating a user, and an information processing method.

An information processing apparatus such as a personal computer may execute an authentication process for authenticating a user. In this type of information processing apparatus, during the execution of the authentication process, an authentication code input screen is displayed on a display portion to receive an authentication code such as a password input by the user. It is then determined, based on the authentication code input on the authentication code input screen, whether the authentication is successful or unsuccessful. Here, there is known an information processing apparatus that puts a limit to the number of times that the user can input the authentication code during the authentication process. For example, in the case of this information processing apparatus, if the number of times that the authentication is determined to be unsuccessful exceeds an upper limit number of times, a predetermined process of, for example, deleting data stored in a storage portion is executed.

SUMMARY

An information processing apparatus according to an aspect of the present disclosure includes a reception processing portion, an authentication determining portion, a presence/absence determining portion, a storage processing portion, and a process executing portion. The reception processing portion receives an authentication code input via an operation portion, the authentication code being composed of one or more letters that are a character(s), a numeral(s), a sign(s), or any combination of a character(s), a numeral(s) and a sign(s). The authentication determining portion, each time an input authentication code is received by the reception processing portion, determines, based on the authentication code, whether an authentication is successful or unsuccessful. The presence/absence determining portion, when the authentication determining portion determines that the authentication is unsuccessful, determines whether the authentication code by which the authentication was determined to be unsuccessful is present or absent in a predetermined first storage portion. The storage processing portion stores, in the first storage portion after a determination of the presence/absence determining portion, the authentication code by which the authentication was determined to be unsuccessful. The process executing portion executes a predetermined process when a number of times that the presence/absence determining portion determined that the authentication code was absent has exceeded a predetermined upper limit number of times.

An information processing apparatus according to another aspect of the present disclosure includes a reception processing portion, a presence/absence determining portion, an authentication determining portion, a storage processing portion, and a process executing portion. The reception processing portion receives an authentication code input via an operation portion, the authentication code being composed of one or more letters that are a character(s), a numeral(s), a sign(s), or any combination of a character(s), a numeral(s) and a sign(s). The presence/absence determining portion, each time an input authentication code is received by the reception processing portion, determines whether the authentication code is present or absent in a predetermined first storage portion. The authentication determining portion, when the presence/absence determining portion determines that the authentication code is absent in the first storage portion, determines based on the authentication code whether an authentication is successful or unsuccessful. The storage processing portion stores, in the first storage portion, the authentication code by which the authentication was determined to be unsuccessful by the authentication determining portion. The process executing portion executes a predetermined process when a number of times that the authentication determining portion determined that the authentication was unsuccessful has exceeded a predetermined upper limit number of times.

An information processing method according to a further aspect of the present disclosure includes a first step, a second step, a third step, a fourth step, and a fifth step. In the first step, an authentication code input via an operation portion is received, wherein the authentication code is composed of one or more letters that are a character(s), a numeral(s), a sign(s), or any combination of a character(s), a numeral(s) and a sign(s). In the second step, each time an input authentication code is received by the first step, it is determined based on the authentication code whether an authentication is successful or unsuccessful. In the third step, when it is determined in the second step that the authentication is unsuccessful, it is determined whether the authentication code by which the authentication was determined to be unsuccessful is present or absent in a predetermined first storage portion. In the fourth step, the authentication code by which the authentication was determined to be unsuccessful in the second step is stored in the first storage portion after a determination in the third step. In the fifth step, a predetermined process is executed when a number of times that it was determined in the third step that the authentication code was absent has exceeded a predetermined upper limit number of times.

An information processing method according to a still further aspect of the present disclosure includes a first step, a second step, a third step, a fourth step, and a fifth step. In the first step, an authentication code input via an operation portion is received, wherein the authentication code is composed of one or more letters that are a character(s), a numeral(s), a sign(s), or any combination of a character(s), a numeral(s) and a sign(s). In the second step, each time an input authentication code is received by the first step, it is determined whether the authentication code is present or absent in a predetermined first storage portion. In the third step, when it is determined in the second step that the authentication code is absent in the first storage portion, it is determined whether an authentication is successful or unsuccessful based on the authentication code that was determined to be absent in the first storage portion in the second step. In the fourth step, the authentication code by which the authentication was determined to be unsuccessful in the third step is stored in the first storage portion. In the fifth step, a predetermined process is executed when a number of times that it was determined in the third step that the authentication was unsuccessful has exceeded a predetermined upper limit number of times.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the accompanying drawings. It should be noted that the following embodiment is an example of a specific embodiment of the present disclosure and should not limit the technical scope of the present disclosure.

First Embodiment

First, an outlined configuration of an image processing apparatus 10 according to a first embodiment of the present disclosure is described with reference to FIG. 1 and FIG. 2. Here, FIG. 1 is a schematic cross-sectional view showing a configuration of the image processing apparatus 10.

The image processing apparatus 10 is a multifunction peripheral having a plurality of functions such as a scan function for reading image data from a document sheet, a print function for forming an image based on the image data, a facsimile function, and a copy function. Here, the image processing apparatus 10 is an example of the information processing apparatus of the present disclosure. It is noted that the present disclosure is applicable to information processing apparatuses such as a scanner device, a printer device, a facsimile device, a copier, a personal computer, a smartphone, a tablet terminal, and an ATM (Automated Teller Machine).

Figure 1:
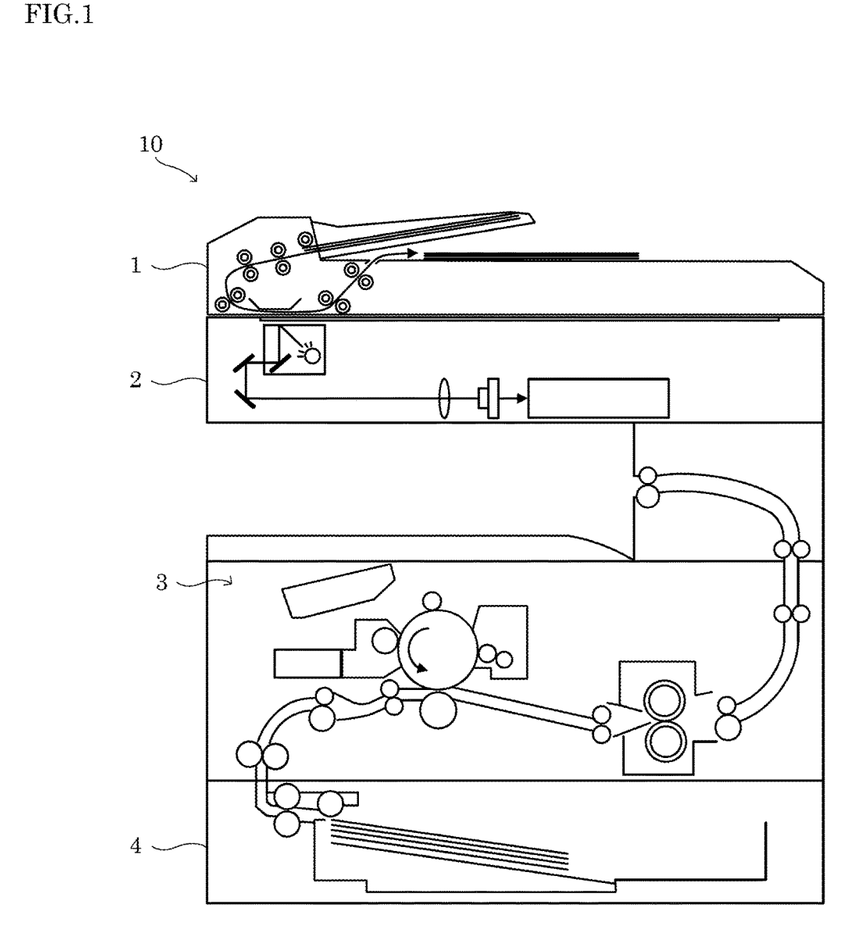
FIG. 1 is a diagram showing a configuration of an image processing apparatus according to a first embodiment of the present disclosure.
Figure 2:
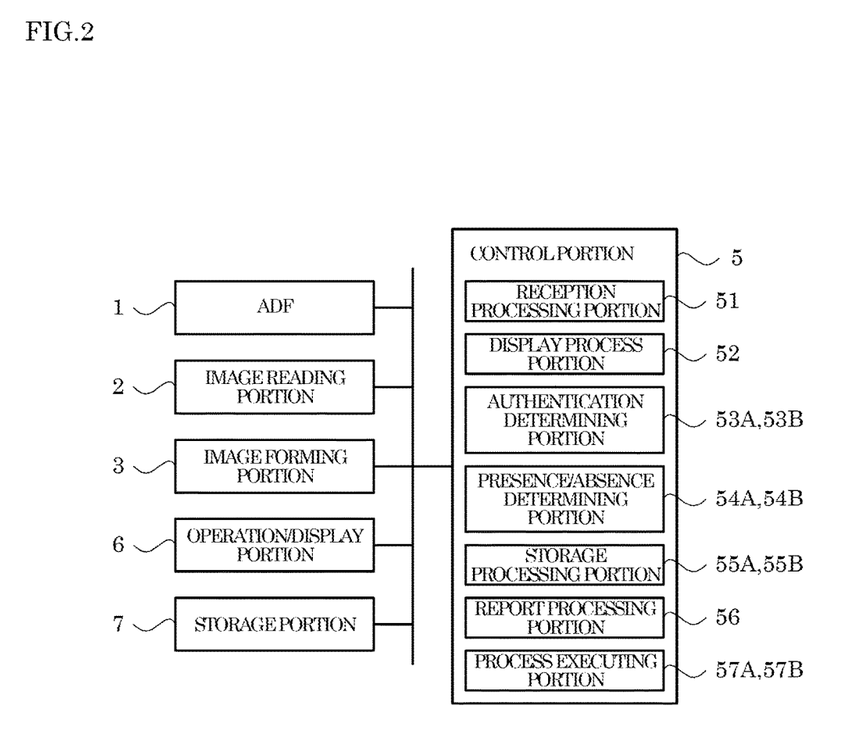
FIG. 2 is a block diagram showing a system configuration of the image processing apparatus according to the first embodiment of the present disclosure.

As shown in FIG. 1 and FIG. 2, the image processing apparatus 10 includes an ADF (Auto Document Feeder) 1, an image reading portion 2, an image forming portion 3, a sheet feed portion 4, a control portion 5, an operation/display portion 6, and a storage portion 7.

The ADF 1 includes a document sheet setting portion, a plurality of conveyance rollers, a document sheet pressing, and a sheet discharge portion, and conveys a document sheet so that it is read by the image reading portion 2. The image reading portion 2 includes a document sheet table, a light source, a plurality of mirrors, an optical lens, and a CCD, and is configured to read image data from a document sheet.

The image forming portion 3 is configured to form an image by the electrophotography based on image data read by the image reading portion 2 or input from an external information processing apparatus. Specifically, the image forming portion 3 includes a photoconductor drum, a charging device, a laser scanning unit, a developing device, a transfer roller, a cleaning device, a fixing roller, a pressure roller, and a sheet discharge portion. In the image forming portion 3, an image is formed on a sheet supplied from the sheet feed portion 4, and the sheet with the image formed thereon is discharged to the sheet discharge portion.

The control portion 5 includes control equipment such as CPU, ROM, RAM, and EEPROM that are not shown. The CPU is a processor that executes various calculation processes. The ROM is a nonvolatile storage portion in which various information such as control programs for causing the CPU to execute various processes are stored in advance. The RAM is a volatile storage portion, and the EEPROM is a nonvolatile storage portion. The RAM and the EEPROM are used as a temporary storage memory (working area) for the various processes executed by the CPU. In the control portion 5, the CPU executes the various control programs stored in advance in the ROM. This allows the image processing apparatus 10 to be controlled comprehensively by the control portion 5. It is noted that the control portion 5 may be formed as an electronic circuit such as an integrated circuit (ASIC), and may be a control portion provided independently of a main control portion that comprehensively controls the image processing apparatus 10.

The operation/display portion 6 includes a display portion and an operation portion. The display portion is, for example, a liquid crystal display and displays various types of information based on control instructions from the control portion 5. The operation portion is composed of, for example, operation keys or a touch panel through which various types of information are input to the control portion 5 based on user operations. Here, the operation/display portion 6 is an example of the operation portion of the present disclosure.

The storage portion 7 is a nonvolatile storage device. The storage portion 7 is, for example, a storage device such as a flash memory, an SSD (Solid State Drive), or an HDD (Hard Disk Drive).

Meanwhile, in an information processing apparatus such as a personal computer, an authentication process for authenticating a user may be executed. In this type of information processing apparatus, during the execution of the authentication process, an authentication code input screen is displayed to receive an authentication code input by the user, wherein the authentication code is, for example, a password composed of one or more letters that may be a character(s), a numeral(s), a sign(s), or any combination of a character(s), a numeral(s) and a sign(s). It is then determined, based on the authentication code input on the authentication code input screen, whether the authentication is successful or unsuccessful. Here, there is known an information processing apparatus that can put a limit to the number of times that the user can input the authentication code during the authentication process. For example, in the case of this information processing apparatus, if the number of times that the authentication is determined to be unsuccessful exceeds an upper limit number of times, a predetermined process of, for example, deleting data stored in a storage portion is executed.

On the other hand, in general, in this type of information processing apparatus, a restriction is made to the display of the authentication code input on the authentication code input screen by the user so as to prevent the authentication code from being peeped by another person. For example, in this type of information processing apparatus, the input authentication code is replaced with a sign(s) such as an asterisk(s), and the sign(s) is displayed. In this case, the user cannot confirm if the user has correctly input the authentication code on the authentication code input screen. As a result, if the authentication process results in a failure, the user cannot determine whether or not the authentication process failure has been caused by an erroneous input operation. Here, the user may input the same authentication code that the user input once by incorrectly recognizing that the authentication process failure was caused by an erroneous input operation. In this case, the authentication is determined to be unsuccessful again because the same, incorrect authentication code was input. This reduces the number of times that the user can input authentication codes that are different from authentication codes that have already been input. On the other hand, as described below, according to the image processing apparatus 10 of the present embodiment, during the authentication process, it is possible to prevent the reduction of the number of times that the user can input authentication codes that are different from authentication codes that have already been input.

Figure 3:
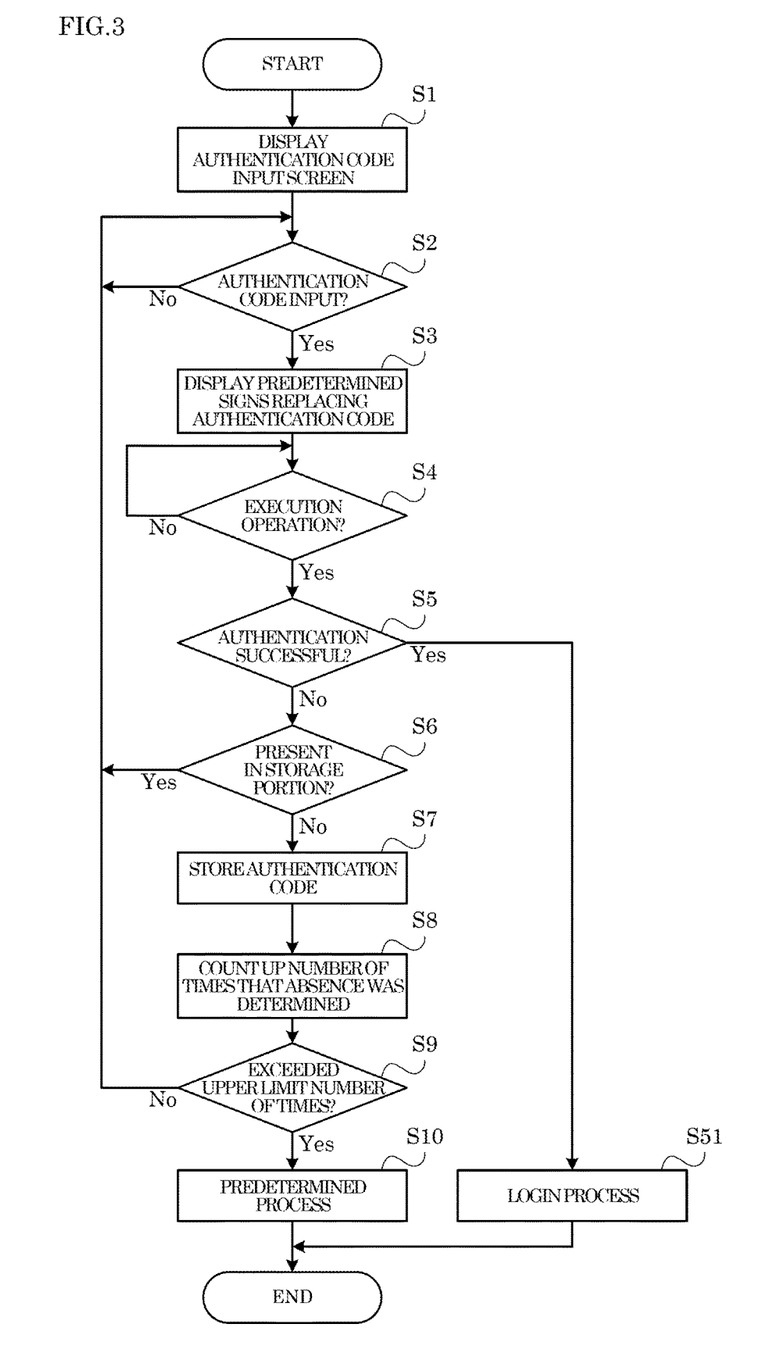
FIG. 3 is a flowchart showing an example of a first authentication process executed by the image processing apparatus according to the first embodiment of the present disclosure.

Specifically, the ROM of the control portion 5 stores a first authentication program in advance, wherein the first authentication program is run to cause the CPU to execute a first authentication process that is described below (see the flowchart shown in FIG. 3). It is noted that the first authentication program may be recorded on a computer-readable recording medium such as a CD, a DVD, or a flash memory, and may be installed from the recording medium to the storage portion 7.

As shown in FIG. 2, the control portion 5 includes a reception processing portion 51, a display process portion 52, an authentication determining portion 53A, a presence/absence determining portion 54A, a storage processing portion 55A, a report processing portion 56, and a process executing portion 57A. Specifically, the control portion 5 executes the first authentication program stored in the ROM by using the CPU. This allows the control portion 5 to function as the reception processing portion 51, the display process portion 52, the authentication determining portion 53A, the presence/absence determining portion 54A, the storage processing portion 55A, the report processing portion 56, and the process executing portion 57A.

The reception processing portion 51 receives an authentication code input via the operation/display portion 6, the authentication code being composed of one or more letters that may be a character(s), a numeral(s), a sign(s), or any combination of a character(s), a numeral(s) and a sign(s). As one example, when a user operation instructing an execution of the first authentication process is performed on the operation/display portion 6, the reception processing portion 51 display the authentication code input screen on the operation/display portion 6, wherein the authentication code input screen allows the user to input an authentication code. The authentication code is, for example, a password or a code number.

The display process portion 52 replaces each component of the input authentication code input to the reception processing portion 51, with a predetermined sign, and displays the signs on the operation/display portion 6. As one example, the display process portion 52 replaces each component of the input authentication code with an asterisk (an example of the predetermined sign), and display the asterisks on the operation/display portion 6.

Each time an input authentication code is received by the reception processing portion 51, the authentication determining portion 53A determines, based on the input authentication code, whether the authentication is successful or unsuccessful.

In the image processing apparatus 10, for example, predetermined registration information is stored in the storage portion 7. When the input authentication code received by the reception processing portion 51 matches the registration information stored in the storage portion 7, the authentication determining portion 53A determines that the authentication is successful. On the other hand, when the input authentication code received by the reception processing portion 51 does not match the registration information stored in the storage portion 7, the authentication determining portion 53A determines that the authentication is unsuccessful.

It is noted that the authentication determining portion 53A may transmit the input authentication code received by the reception processing portion 51 to an external authentication server, and cause the external authentication server to determine, based on the authentication code, whether the authentication is successful or unsuccessful.

In the image processing apparatus 10, when the authentication determining portion 53A determines that the authentication is successful, a login process is executed. The execution of the login process allows the user to use the image processing apparatus 10. For example, when the login process is executed and the user logs in the image processing apparatus 10, the control portion 5 displays an initial operation screen on the operation/display portion 6, wherein the initial operation screen is used for the operation of the image processing apparatus 10.

It is noted that, in the image processing apparatus 10, a plurality of pieces of registration information respectively corresponding to a plurality of users may be stored in the storage portion 7. In this case, the use authority for the use of the image processing apparatus 10 may be set for each of the plurality of users, and the control portion 5 may change the content of the initial operation screen depending on the use authority of the user who logs in.

On the other hand, when the authentication determining portion 53A determines that the authentication is unsuccessful, the reception processing portion 51 urges the user to input the authentication code again. In addition, when the authentication determining portion 53A repeatedly determines that the authentication is unsuccessful, the user may be inhibited from inputting the authentication code, as described below.

The presence/absence determining portion 54A determines, when the authentication determining portion 53A has determined that the authentication is unsuccessful, whether the authentication code is present or absent in a predetermined storage area of the RAM. Here, the predetermined storage area of the RAM is an example of the first storage portion of the present disclosure.

After the determination of the presence/absence determining portion 54A, the storage processing portion 55A stores, in the storage area of the RAM, the authentication code by which the authentication was determined to be unsuccessful by the authentication determining portion 53A. As one example, the storage processing portion 55A stores, in the storage area of the RAM, the authentication code by which the authentication was determined to be unsuccessful by the authentication determining portion 53A and which was determined to be absent in the storage area of the RAM by the presence/absence determining portion 54A. It is noted that the storage processing portion 55A may store, in the storage area of the RAM, the authentication code that was determined to be absent in the storage area of the RAM by the presence/absence determining portion 54A, as well as an authentication code that was determined to be present by the presence/absence determining portion 54A.

When the presence/absence determining portion 54A determines that the authentication code is present in the storage area of the RAM, the report processing portion 56 reports the fact. For example, the report processing portion 56 reports it by displaying, on the operation/display portion 6, a message indicating that the presence/absence determining portion 54A has determined that the authentication code is present in the storage area of the RAM.

The process executing portion 57A executes a predetermined process when the number of times that the presence/absence determining portion 54A determined that the authentication code was absent has exceeded a predetermined upper limit number of times.

The predetermined process includes, for example, a reception prohibiting process of prohibiting the reception of the input authentication code by the reception processing portion 51. For example, in the reception prohibiting process, the reception of the input authentication code by the reception processing portion 51 is prohibited for a predetermined period. It is noted that the prohibition of the reception of the input authentication code by the reception prohibiting process may be released by the manager of the image processing apparatus 10.

It is noted that the predetermined process may include a data deleting process of deleting a part or all of data stored in a predetermined storage area of the storage portion 7. Here, the storage area of the storage portion 7 is an example of the second storage portion of the present disclosure.

Furthermore, the predetermined process may include a notification process of notifying a predetermined notification destination of a fact that the number of times that the presence/absence determining portion 54A determined that the authentication code was absent has exceeded a predetermined upper limit number of times. As one example, in the notification process, an electronic mail is sent to a mail address stored in the storage portion 7 in advance, wherein the electronic mail includes a message indicating that the number of times that the presence/absence determining portion 54A determined that the authentication code was absent has exceeded the upper limit number of times.

[First Authentication Process]

In the following, with reference to FIG. 3, a description is given of an example of the procedure of the first authentication process executed by the control portion 5 in the image processing apparatus 10 of the first embodiment of the present disclosure, and the information processing method of the present disclosure. Here, steps S1, S2, . . . represent numbers assigned to the processing procedures (steps) executed by the control portion 5. It is noted that the control portion 5 executes the first authentication process when a user operation instructing to execute the first authentication process is performed on the operation/display portion 6.

<Step S1>

First, in step S1, the control portion 5 displays, on the operation/display portion 6, the authentication code input screen used for the input of the authentication code. Here, the process of step S1 is an example of the first step of the present disclosure, and is executed by the reception processing portion 51 of the control portion 5.

<Step S2>

In step S2, the control portion 5 determines whether or not an authentication code was input on the authentication code input screen displayed in step S1.

Upon determining that an authentication code was input on the authentication code input screen displayed in step S1 (Yes at S2), the control portion 5 moves the process to step S3. In addition, upon determining that an authentication code has not been input (No at S2), the control portion 5 waits at step S2 for an authentication code to be input.

<Step S3>

In step S3, the control portion 5 replaces each component of the authentication code input in step S2 with a predetermined sign such as asterisk, and display the predetermined signs on the operation/display portion 6. Here, the process of step S2 is executed by the display process portion 52 of the control portion 5.

<Step S4>

In step S4, the control portion 5 determines whether or not an execution operation for the login process was performed.

Upon determining that the execution operation for the login process was performed (Yes at S4), the control portion 5 moves the process to step S5. In addition, upon determining that the execution operation has not been performed (No at S4), the control portion 5 waits at step S4 for the execution operation to be performed.

Figure 4:
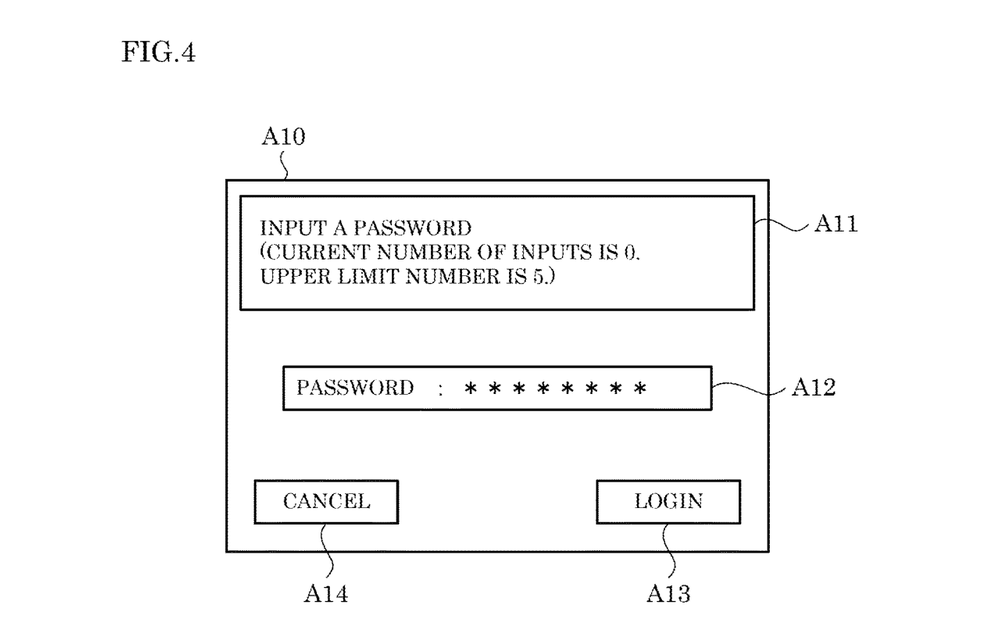
FIG. 4 is a diagram showing an example of an authentication code input screen displayed during an execution of the first authentication process by the image processing apparatus according to the first embodiment of the present disclosure.

FIG. 4 shows an example of the authentication code input screen displayed on the operation/display portion 6 by the control portion 5 in step S1. An authentication code input screen A10 shown in FIG. 4 includes a message display field A11, a password input field A12, and operation keys A13 to A14.

A message for the user is displayed on the message display field A11. In the example shown in FIG. 4, a message urging the user to input a password, a current number of times that a password was input, and the upper limit number of times are displayed in the message display field A11. Asterisks replacing the components of an input password (an example of the authentication code) are displayed in the password input field A12.

When the user operates the operation key A13 on the authentication code input screen A10 in the state where the password has been input, the control portion 5 executes the login process through which the user logs in the image processing apparatus 10. That is, the operation of the operation key A13 is a concrete example of the execution operation in step S4.

On the other hand, when the user operates the operation key A14 on the authentication code input screen A10, the control portion 5 ends the first authentication process.

<Step S5>

In step S5, the control portion 5 determines, based on the authentication code input in step S2, whether the authentication is successful or unsuccessful. Here, the process of step S5 is an example of the second step of the present disclosure, and is executed by the authentication determining portion 53A of the control portion 5.

The control portion 5 determines that the authentication is successful, for example, in the case where the authentication code input in step S2 matches the registration information stored in the storage portion 7. On the other hand, the control portion 5 determines that the authentication is unsuccessful in the case where the authentication code input in step S2 does not match the registration information stored in the storage portion 7.

It is noted that the control portion 5 may transmit the authentication code input in step S2 to an external authentication server, and cause the authentication server to determine, based on the authentication code input in step S2, whether the authentication is successful or unsuccessful.

Here, upon determining that the authentication is successful based on the authentication code input in step S2 (Yes at S5), the control portion 5 moves the process to step S51. In addition, upon determining that the authentication is unsuccessful based on the authentication code input in step S2 (No at S5), the control portion 5 moves the process to step S6.

<Step S51>

In step S51, the control portion 5 executes the login process through which the user logs in the image processing apparatus 10. As one example, the control portion 5 displays the initial operation screen on the operation/display portion 6, wherein the initial operation screen is used for the operation of the image processing apparatus 10.

<Step S6>

In step S6, the control portion 5 determines whether or not the authentication code by which the authentication was determined to be unsuccessful in step S5, is present in the storage area of the RAM. Here, the process of step S6 is an example of the third step of the present disclosure, and is executed by the presence/absence determining portion 54A of the control portion 5.

Here, upon determining that the authentication code by which the authentication was determined to be unsuccessful in step S5, is present in the storage area of the RAM (Yes at S6), the control portion 5 moves the process to step S2, and waits for a re-input of the authentication code. In addition, upon determining that the authentication code by which the authentication was determined to be unsuccessful in step S5, is absent in the storage area of the RAM (No at S6), the control portion 5 moves the process to step S7.

<Step S7>

In step S7, the control portion 5 stores, in the storage area of the RAM, the authentication code by which the authentication was determined to be unsuccessful in step S5. As one example, the control portion 5 stores, in the storage area, the authentication code that was determined to be absent in the storage area in step S6. Here, the process of step S7 is an example of the fourth step of the present disclosure, and is executed by the storage processing portion 55A of the control portion 5.

It is noted that the storage area of the RAM is secured by the control portion 5 when the execution of the first authentication process is started. For example, the control portion 5 secures, as the storage area, an area having a sufficient capacity to store a plurality of authentication codes in the RAM when the execution of the first authentication process is started. In addition, the control portion 5 may secure, as the storage area, an area having a sufficient capacity to store one authentication code in the RAM when the execution of the first authentication process is started. In this case, in step S7, the control portion 5 stores, in the storage area of the RAM, the authentication code by which the authentication was determined to be unsuccessful in step S5, by overwriting an existing authentication code in the storage area.

In addition, the authentication code stored in the storage area of the RAM in the first authentication process is deleted by the control portion 5 when the first authentication process ends. Furthermore, when the user has operated the operation key A14 on the authentication code input screen A10 shown in FIG. 4 to end the first authentication process, the authentication code stored in the storage area of the RAM may be deleted after a predetermined time period has passed.

<Step S8>

In step S8, the control portion 5 counts up the number of times that the control portion 5 determined in step S6 that the authentication code was absent. For example, the control portion 5 increments presence/absence determination frequency information that is stored in the RAM in advance, the presence/absence determination frequency information indicating the number of times that the control portion 5 determined in step S6 that the authentication code was absent. For example, at the start of the execution of the first authentication process by the control portion 5, the presence/absence determination frequency information indicating that the number of times that the control portion 5 determined in step S6 that the authentication code was absent is 0 (zero), is stored in the RAM.

<Step S9>

In step S9, the control portion 5 determines whether or not the number of times that it was determined in step S6 that the authentication code was absent has exceeded the upper limit number of times. Specifically, the control portion 5 determines, based on the presence/absence determination frequency information stored in the RAM, whether or not the number of times that it was determined in step S6 that the authentication code was absent has exceeded the upper limit number of times.

Upon determining that the number of times that it was determined in step S6 that the authentication code was absent has exceeded the upper limit number of times (Yes at S9), the control portion 5 moves the process to step S10. In addition, upon determining that the number of times that it was determined in step S6 that the authentication code was absent has not exceeded the upper limit number of times (No at S9), the control portion 5 moves the process to step S2 and waits for an authentication code to be input again.

Figure 5:
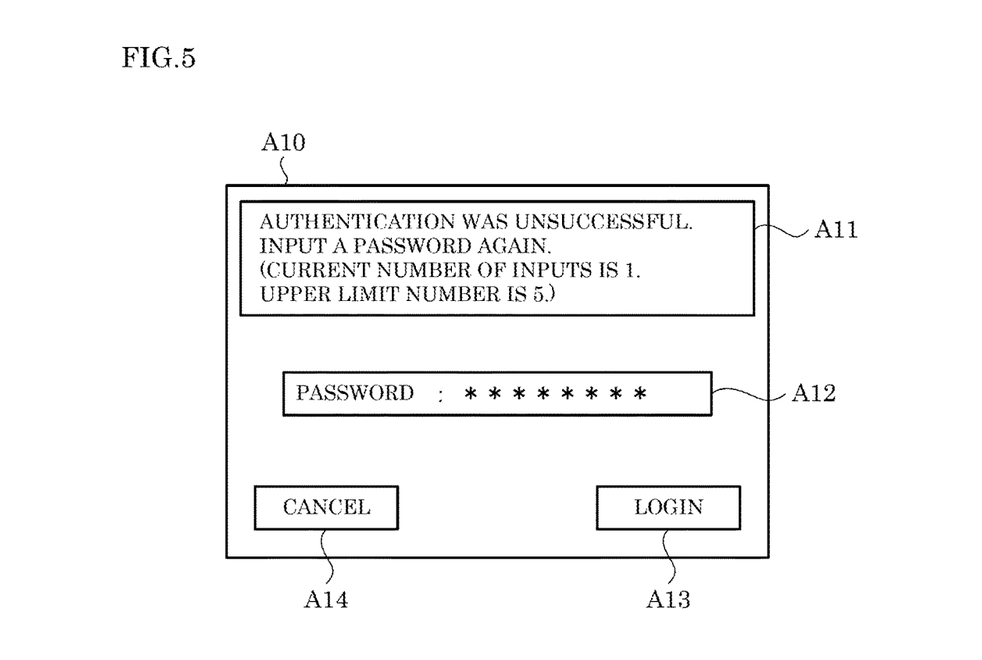
FIG. 5 is a diagram showing an example of the authentication code input screen displayed during an execution of the first authentication process by the image processing apparatus according to the first embodiment of the present disclosure.

Here, FIG. 5 shows an example of the authentication code input screen displayed after the control portion 5 executes the process of step S2 after determining in step S9 that the number of times that it was determined in step S6 that the authentication code was absent has not exceeded the upper limit number of times. The authentication code input screen A10 shown in FIG. 5 differs from that shown in FIG. 4 in the display content of the message display field A11.

Specifically, the message display field A11 shown in FIG. 5 displays a message indicating that the authentication was unsuccessful and urging the user to input a password again. In addition, the message display field A11 shown in FIG. 5 indicates that the current number of times that a password was input has been updated. In the first authentication process, the current number of times that a password was input is updated each time it is determined in step S6 that the authentication code is absent. That is, the current number of times that a password was input, displayed in the message display field A11, is the same as the number of times that the authentication code was determined to be absent in step S6, which is indicated by the presence/absence determination frequency information.

On the other hand, the authentication code input screen A10 shown in FIG. 5 is also displayed during the process of step S2 that is executed by the control portion 5 after it is determined in step S6 that the authentication code by which the authentication was determined to be unsuccessful in step S5, is present in the storage area of the RAM. In this case, the current number of times that a password was input, which is displayed in the message display field A11, is not updated.

It is noted that in the case where it is determined in step S6 that the authentication code by which the authentication was determined to be unsuccessful in step S5, is present in the storage area of the RAM, the control portion 5 may display a message indicating that the authentication code input in step S2 is present in the storage area of the RAM, on the authentication code input screen displayed during the process of step S2 that is executed thereafter. In this case, the process of displaying the message is executed by the report processing portion 56 of the control portion 5.

<Step S10>

In step S10, the control portion 5 executes the predetermined process. Here, the process of step S10 is an example of the fifth step of the present disclosure, and is executed by the process executing portion 57A of the control portion 5.

As one example, the control portion 5 executes the reception prohibiting process of prohibiting the reception of an authentication code input on the authentication code input screen. This prevents a third party from impersonating the user and logging in the image processing apparatus 10.

In addition, the control portion 5 may execute the data deleting process of deleting a part or all of data stored in the storage portion 7. This prevents a third party impersonating the user from stealing the data held by the user.

Furthermore, the control portion 5 may execute the notification process of notifying a predetermined notification destination of a fact that the number of times that the control portion 5 determined in step S6 that the authentication code was absent has exceeded the upper limit number of times. This makes it possible for the manager of the image processing apparatus 10 or the like to recognize a presence of a third party impersonating the user and attempting an unauthorized access to the image processing apparatus 10, and take countermeasures such as enhancing the security.

As described above, in the image processing apparatus 10 according to the first embodiment, first it is determined based on an input authentication code whether an authentication is successful or unsuccessful, and then it is determined whether the authentication code by which the authentication was determined to be unsuccessful is present or absent in a storage area of the RAM. When the number of times that it was determined that the authentication code by which the authentication had been determined to be unsuccessful was absent has exceeded the upper limit number of times, the predetermined process is executed. With this configuration, in the case where the first authentication process is executed, it is possible to prevent the reduction of the number of times that the user can input authentication codes that are different from authentication codes that have already been input.

Second Embodiment

The following describes the image processing apparatus 10 according to a second embodiment of the present disclosure. The second embodiment differs from the first embodiment in a partial configuration of the control portion 5. Otherwise, the second embodiment has the same configuration as the first embodiment. As a result, in the following description, the configurational elements of the second embodiment that are the same as those of the first embodiment are assigned the same reference signs, and description thereof is omitted.

Specifically, the ROM of the control portion 5 stores a second authentication program in advance, wherein the second authentication program is run to cause the CPU to execute a second authentication process that is described below (see the flowchart shown in FIG. 6). As shown in FIG. 2, the control portion 5 includes a reception processing portion 51, a display process portion 52, an authentication determining portion 53B, a presence/absence determining portion 54B, a storage processing portion 55B, a report processing portion 56, and a process executing portion 57B.

The presence/absence determining portion 54B determines, each time an input authentication code is received by the reception processing portion 51, whether the authentication code is present or absent in the storage area of the RAM.

The authentication determining portion 53B determines whether the authentication is successful or unsuccessful based on the authentication code that was determined to be absent in the storage area of the RAM by the presence/absence determining portion 54B.

The storage processing portion 55B stores, in the storage area of the RAM, the authentication code by which the authentication was determined to be unsuccessful by the authentication determining portion 53B.

The process executing portion 57B executes the predetermined process when the number of times that the authentication determining portion 53B determined the authentication to be unsuccessful has exceeded the upper limit number of times. As one example, the predetermined process includes a notification process of notifying the notification destination of a fact that the number of times that the authentication determining portion 53B determined the authentication to be unsuccessful has exceeded the upper limit number of times.

[Second Authentication Process]

In the following, with reference to FIG. 6, a description is given of an example of the procedure of the second authentication process executed by the control portion 5 in the image processing apparatus 10 of the second embodiment of the present disclosure, and another example of the information processing method of the present disclosure. In the second authentication process, the processes of step S5 and step S6 of the first authentication process are exchanged in the order. In addition, in the second authentication process, a process of step S11 is executed after the process of step S6 of the first authentication process. In addition, in the second authentication process, a process of step S12 is executed in place of the process of step S8 of the first authentication process.

It is noted that the process of step S1 executed in the second authentication process is another example of the first step of the present disclosure, and is executed by the reception processing portion 51 of the control portion 5. In addition, the process of step S6 executed in the second authentication process is another example of the second step of the present disclosure, and is executed by the presence/absence determining portion 54B of the control portion 5. In addition, the process of step S5 executed in the second authentication process is another example of the third step of the present disclosure, and is executed by the authentication determining portion 53B of the control portion 5. In addition, the process of step S7 executed in the second authentication process is another example of the fourth step of the present disclosure, and is executed by the storage processing portion 55B of the control portion 5. In addition, the process of step S10 executed in the second authentication process is another example of the fifth step of the present disclosure, and is executed by the process executing portion 57B of the control portion 5.

Figure 6:
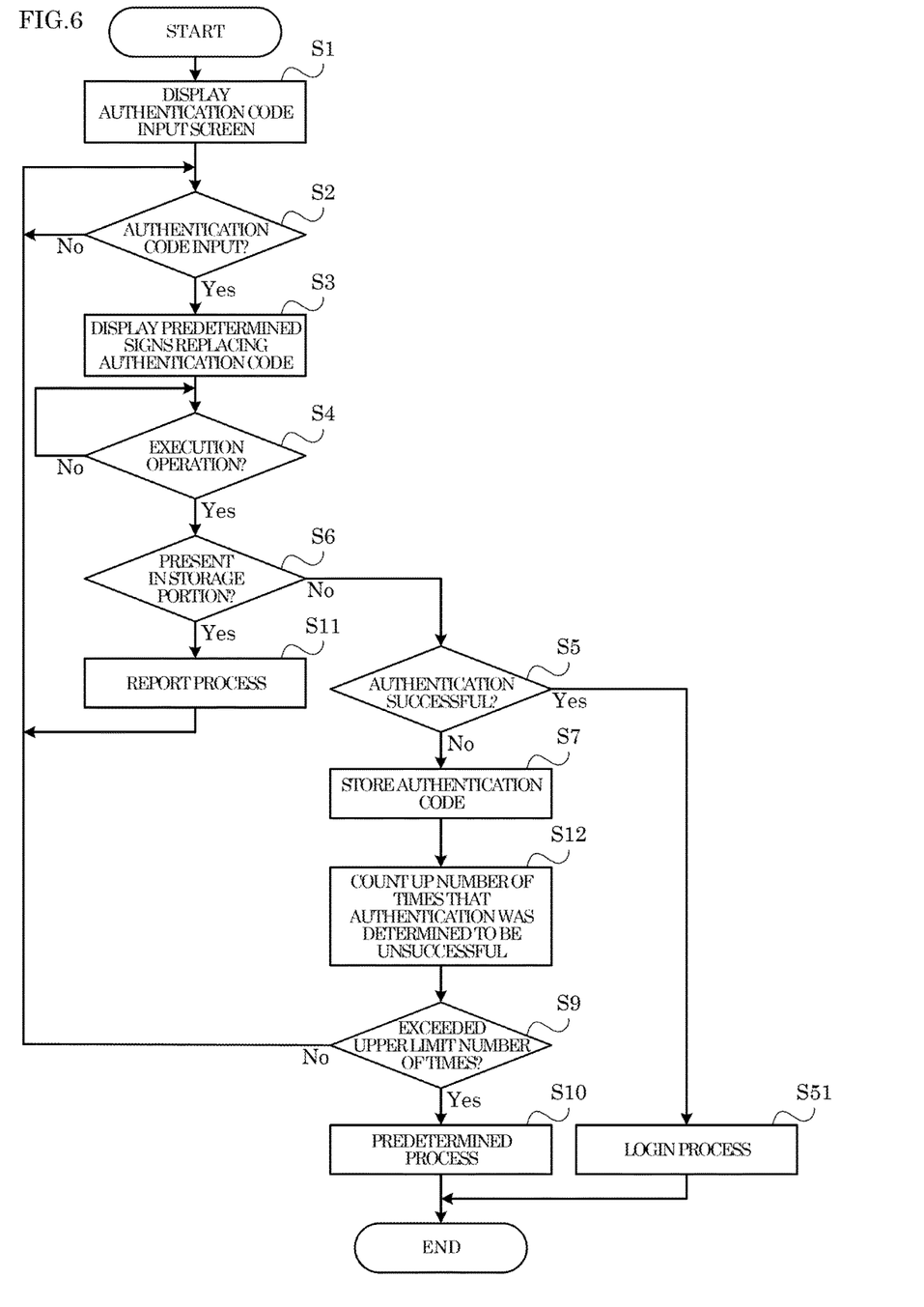
FIG. 6 is a flowchart showing an example of a second authentication process executed by the image processing apparatus according to a second embodiment of the present disclosure.

As shown in FIG. 6, in the second authentication process, the process of step S6 is executed after the process of step S4. When it is determined in step S6 that the authentication code input in step S2 is absent in the storage area of the RAM (No at S6), the process of step S5 is executed. With this configuration, in the case where the external authentication server is caused to determine whether the authentication is successful or unsuccessful based on the authentication code input in step S2, the number of times that the authentication code is transmitted to the authentication server is reduced.

<Step S11>

In step S11, the control portion 5 reports that the authentication code input in step S2 is present in the storage area of the RAM. Here, the process of step S11 is executed by the report processing portion 56 of the control portion 5.

The control portion 5, as one example, reports it by displaying on the operation/display portion 6 a message indicating that the authentication code input in step S2 is present in the storage area of the RAM. This enables the user to recognize that the unsuccessful authentication was not caused by an erroneous input of the authentication code.

Figure 7:
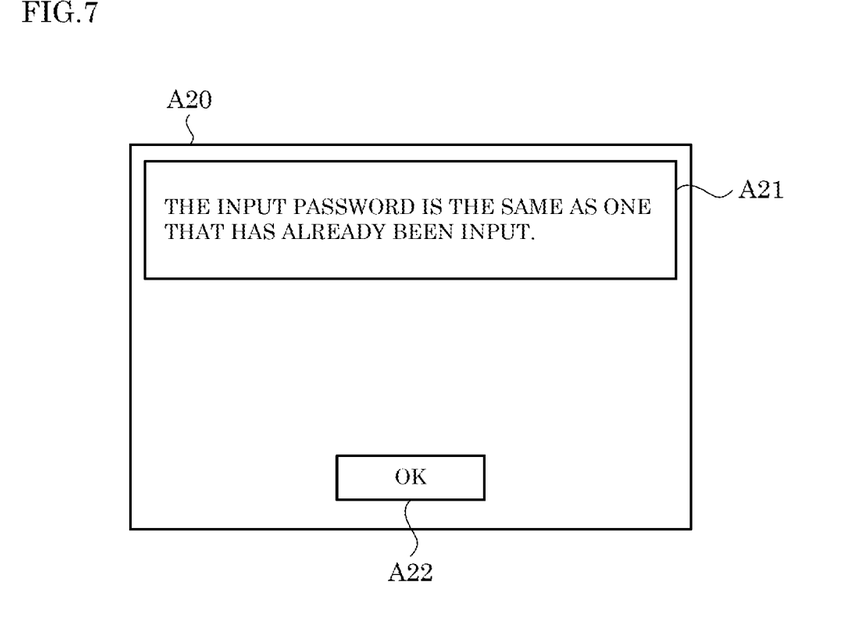
FIG. 7 is a diagram showing an example of an authentication code input screen displayed during an execution of the second authentication process by the image processing apparatus according to the second embodiment of the present disclosure.

FIG. 7 shows an example of the display screen displayed on the operation/display portion 6 by the control portion 5. A display screen A20 shown in FIG. 7 includes a message display field A21 and an operation key A22. In the message display field A21, a message indicating that the authentication code input in step S2 is present in the storage area of the RAM is displayed. When the user operates the operation key A22 on the display screen A20, the process is moved to step S2 by the control portion 5, and the display screen displayed on the operation/display portion 6 is switched to the authentication code input screen.

<Step S12>

In step S12, the control portion 5 counts up the number of times that the control portion 5 determined in step S5 that the authentication was unsuccessful. For example, the control portion 5 increments authentication determination frequency information that is stored in the RAM in advance, the authentication determination frequency information indicating the number of times that the control portion 5 determined in step S5 that the authentication was unsuccessful. For example, in the second authentication process, at the start of the execution of the second authentication process by the control portion 5, the authentication determination frequency information indicating that the number of times that the control portion 5 determined in step S5 that the authentication was unsuccessful is 0 (zero), is stored in the RAM.

As described above, in the image processing apparatus 10 according to the second embodiment, first it is determined whether an input authentication code is present or absent in the storage area of the RAM, and then it is determined whether the authentication is successful or unsuccessful based on the authentication code that was determined to be absent in the storage area of the RAM. When the number of times that it was determined that the authentication was unsuccessful has exceeded the upper limit number of times, the predetermined process is executed. With this configuration, in the case where the second authentication process is executed, it is possible to prevent the reduction of the number of times that the user can input authentication codes that are different from authentication codes that have already been input.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An information processing apparatus comprising:
a processor configured to execute:
a reception processing portion to receive an authentication code input via an operation portion, the authentication code being composed of one or more letters that are a character(s), a numeral(s), a sign(s), or any combination of a character(s), a numeral(s) and a sign(s);
an authentication determining portion to, each time an input authentication code is received by the reception processing portion, determine, based on the authentication code, whether an authentication is successful or unsuccessful;
a presence/absence determining portion to, when the authentication determining portion determines that the authentication is unsuccessful, determine whether the authentication code by which the authentication was determined to be unsuccessful is present or absent in a predetermined first storage portion;
a storage processing portion to store, in the first storage portion after a determination of the presence/absence determining portion, the authentication code by which the authentication was determined to be unsuccessful; and
a process executing portion to execute a predetermined process when a number of times that the presence/absence determining portion determined that the authentication code was absent has exceeded a predetermined upper limit number of times, the predetermined process including a reception prohibiting process of prohibiting reception of the input authentication code by the reception processing portion, wherein
the reception processing portion receives the input authentication code again when the presence/absence determining portion determines that the authentication code is present in the first storage portion, or when the presence/absence determining portion determines that the authentication code is absent in the first storage portion and the number of times that the presence/absence determining portion determined that the authentication code was absent is equal to or smaller than the upper limit number of times.

2. The information processing apparatus according to claim 1, wherein the processor is further configured to execute:
a report processing portion to, after the presence/absence determining portion determines that the authentication code is present in the first storage portion, report information based on a fact that the presence/absence determining portion determined that the authentication code was present in the first storage portion.

3. The information processing apparatus according to claim 1, wherein
the predetermined process includes one or both of a data deleting process and a notification process, the data deleting process being a process of deleting a part or all of data stored in a predetermined second storage portion, the notification process being a process of notifying a predetermined notification destination of a fact that the number of times that the presence/absence determining portion determined that the authentication code was absent has exceeded the upper limit number of times.

4. The information processing apparatus according to claim 1, further comprising either or both of:
a scanner configured to read image data from a document sheet; and
a printer configured to form an image based on image data.

5. An information processing method comprising:
a first step of receiving an authentication code input via an operation portion, the authentication code being composed of one or more letters that are a character(s), a numeral(s), a sign(s), or any combination of a character(s), a numeral(s) and a sign(s);
a second step of, each time an input authentication code is received by the first step, determining, based on the authentication code, whether an authentication is successful or unsuccessful;
a third step of, when it is determined in the second step that the authentication is unsuccessful, determining whether the authentication code by which the authentication was determined to be unsuccessful is present or absent in a predetermined first storage portion;
a fourth step of storing, in the first storage portion after a determination in the third step, the authentication code by which the authentication was determined to be unsuccessful in the second step; and
a fifth step of executing a predetermined process when a number of times that it was determined in the third step that the authentication code was absent has exceeded a predetermined upper limit number of times, the predetermined process including a reception prohibiting process of prohibiting reception of the input authentication code in the first step, wherein
the input authentication code is received again in the first step when the third step determines that the authentication code is present in the first storage portion, or when the third step determines that the authentication code is absent in the first storage portion and the number of times that the third step determined that the authentication code was absent is equal to or smaller than the upper limit number of times.

* * * * *